US012118478B2

(12) United States Patent
Divakarmurthy et al.

(10) Patent No.: US 12,118,478 B2
(45) Date of Patent: Oct. 15, 2024

(54) SYSTEMS AND METHODS FOR MACHINE LEARNING BASED RULE DISCOVERY FOR DATA MIGRATION

(71) Applicant: FMR LLC, Boston, MA (US)

(72) Inventors: Pramod Divakarmurthy, Bangalore (IN); Hua Zhai Solomon, Cary, NC (US); Nikhil Raikar, Cary, NC (US); Prabhakar Mani, Morrisville, NC (US); Amol Vinayak Jadhav, Bangalore (IN); Behlool Sabir, Bangalore (IN); Yugang Jia, Winchester, MA (US); Bidhan Roy, Bangalore (IN); Mark Homer, Providence, RI (US)

(73) Assignee: FMR LLC, Boston, MA (US)

( * ) Notice: Subject to any disclaimer, the term of this patent is extended or adjusted under 35 U.S.C. 154(b) by 1092 days.

(21) Appl. No.: 16/998,674

(22) Filed: Aug. 20, 2020

(65) Prior Publication Data
US 2021/0350258 A1 Nov. 11, 2021

Related U.S. Application Data

(60) Provisional application No. 63/021,953, filed on May 8, 2020.

(51) Int. Cl.
*G06N 5/04* (2023.01)
*G06F 16/93* (2019.01)
(Continued)

(52) U.S. Cl.
CPC ............... *G06N 5/04* (2013.01); *G06F 16/93* (2019.01); *G06F 40/279* (2020.01); *G06N 20/00* (2019.01)

(58) Field of Classification Search
None
See application file for complete search history.

(56) References Cited

U.S. PATENT DOCUMENTS

| 8,996,350 B1 * | 3/2015 | Dub ................. G06F 16/24578 707/673 |
| 9,286,571 B2 | 3/2016 | Cao et al. |

(Continued)

OTHER PUBLICATIONS

"Rule-based Machine Learning," Wikipedia (Year: 2018).*
(Continued)

*Primary Examiner* — Marc S Somers
*Assistant Examiner* — Paul J Breene
(74) *Attorney, Agent, or Firm* — Cesari and McKenna, LLP

(57) ABSTRACT

Systems and methods for deriving classification rules from documents and a database using rule-based machine learning. The method includes extracting first variables from documents corresponding to an organization. The method further includes extracting second variables from a database corresponding to the organization. The method also includes filtering the extracted second variables based on at least one of null values, repeat variables, location variables, ID variables, or data variables. The method further includes deriving first classification rules based on the first variables using a rule-based machine learning algorithm. The method also includes calculating an accuracy of the derived first classification rules. The method also includes deriving second classification rules based on the first variables and the filtered second variables. The method further includes determining a suggested additional variable based on the derived second classification rules and the calculated accuracy.

18 Claims, 7 Drawing Sheets

(51) Int. Cl.
G06F 40/279 (2020.01)
G06N 20/00 (2019.01)

(56) References Cited

U.S. PATENT DOCUMENTS

2012/0179489 A1* 7/2012 Gupta .................... G16H 10/60
705/2
2018/0314972 A1* 11/2018 Swindell ................ G06N 20/00
2019/0114370 A1 4/2019 Cerino et al.
2019/0251182 A1 8/2019 Ray et al.
2019/0354720 A1 11/2019 Tucker et al.

OTHER PUBLICATIONS

"Natural Language Processing," Wikipedia (Year: 2018).*
datamigrationteam@microsoft.com, "Accelerate your Oracle migrations with new machine learning capabilities in SSMA," MSDN, https://techcommunity.microsoft.com/t5/microsoft-data-migration/accelerate-your-oracle-migrations-with-new-machine-learning/ba-p/368733, Feb. 17, 2019.

* cited by examiner

| Plan Name | Initial Variables | Baseline Accuracy (Misclassified) | Best Performance (Misclassified) | Suggested Additional Variables |
|---|---|---|---|---|
| Basic AD&D | Employment, Override, User, Expat | 98.75% (625) | 99.18% (412) | CURRENT_EMP_OR_APL |
| Group Legal | Employment, Override, User, Expat | 99.63% (80) | 99.90% (22) | INELG_RSN_CD_8 |
| Short Term Disability | State, Employment, User, Expat | 99.70% (147) | 99.80% (99) | INELG_RSN_CD_8 |
| Critical Illness High | State, Employment, User, Expat | 99.77% (38) | 99.96% (6) | INELG_RSN_CD_8 |
| Critical Illness Low | State, Employment, User, Expat | 99.77% (38) | 99.96% (6) | INELG_RSN_CD_8 |
| Accident Coverage | State, Employment, User, Expat | 99.77% (38) | 99.96% (6) | INELG_RSN_CD_8 |
| Hospital Confinement | Employment, Override, User, Expat | 99.84% (23) | 99.89% (15) | INELG_RSN_CD_8 |
| Short Term Disability – NY | State, Employment, User, Expat | 99.91% (12) | 99.93% (10) | INELG_RSN_CD_8 |
| Short Term Disability – NJ | State, Employment, User, Expat | 99.97% (4) | 99.99% (2) | REGION_2_3 |
| Short Term Disability – HI | State, Employment, User, Expat | | | |
| Basic Life 50K | Employment, Expat, Base Salary | 99.57% (75) | 99.67% (65) | INELG_RSN_CD_8 |

FIG. 6

SYSTEMS AND METHODS FOR MACHINE LEARNING BASED RULE DISCOVERY FOR DATA MIGRATION

CROSS REFERENCE TO RELATED APPLICATION

This application claims the benefit of priority to U.S. Provisional Patent Application No. 63/021,953, filed May 8, 2020, the entire contents of which are owned by the assignee of the instant application and incorporated herein by reference in its entirety.

FIELD OF THE INVENTION

The present invention relates generally to systems and methods for extracting data from documents and databases, including systems and methods for extracting data from documents using natural language processing and extracting data from databases to discover rules using machine learning-based algorithms.

BACKGROUND OF THE INVENTION

Employers often use human resources (HR) software to manage benefits provided to their employees. Eligibility criteria determines whether an employee is eligible for a particular benefit. Generally, employers determine the eligibility criteria based on the benefits provided, and use the eligibility criteria to determine the benefits their employees are eligible for. The HR software assists employers to manage the complexities of determining eligibility criteria.

Most HR software uses Plan Administration Manual (PAM) documents that contains specific eligibility criteria for each benefit. PAM documents are typically converted to HTML pages and made available for internal business review. The finalized criteria are then configured in to the system, which allows the participants to select the benefits based on their eligibility. However, PAM documents are typically updated regularly, altering the specific eligibility criteria for each benefit. Manually analyzing the updated PAM documents and comparing them to current eligibility criteria is time consuming and often leads to inconsistencies.

SUMMARY OF THE INVENTION

Accordingly, an object of the invention is to provide administrators with systems and methods for analyzing eligibility criteria from documents. It is an object of the invention to provide administrators with systems and methods for deriving classification rules for eligibility criteria from documents and databases. It is an object of the invention to provide administrators with systems and methods for deriving classification rules from documents using rule-based machine learning. It is an object of the invention to provide administrators with systems and methods for deriving classification rules from documents and a database using rule-based machine learning. It is an object of the invention to provide administrators with systems and methods for deriving classification rules from documents and databases using rule-based machine learning.

In some aspects, a method for deriving classification rules from documents and a database using rule-based machine learning includes extracting, by a server computing device, first variables from documents corresponding to an organization. The method further includes extracting, by the server computing device, second variables from a database corresponding to the organization. The method also includes filtering, by the server computing device, the extracted second variables based on at least one of null values, repeat variables, location variables, ID variables, or date variables. The method also includes deriving, by the server computing device, first classification rules based on the first variables using a rule-based machine learning algorithm.

Further, the method includes calculating, by the server computing device, an accuracy of the derived first classification rules. The method also includes deriving, by the server computing device, second classification rules based on the first variables and the filtered second variables. Further, the method includes generating, by the server computing device, for display the derived first classification rules, the derived second classification rules, the calculated accuracy, and the suggested additional variable.

In some embodiments, the server computing device is configured to calculate the accuracy of the derived first classification rules based on known classification rules corresponding to the organization.

In some embodiments, the server computing device is further configured to extract the first variables using natural language processing. In other embodiments, the database comprises demographic data, employment data, and benefit plan data.

In some embodiments, the server computing device is further configured to map the extracted first variables to corresponding entries of the database. In other embodiments, the server computing device is further configured to classify each of the extracted first variables and second variables as character-based or numeric. In some embodiments, the first classification rules are derived sequentially using the rule-based machine learning algorithm.

In some embodiments, the server computing device is further configured to derive the second classification rules based on the first variables and the filtered second variables. In other embodiments, the server computing device is further configured to calculate an accuracy of the derived second classification rules based on known classification rules corresponding to the organization. For example. in some embodiments, the server computing device is further configured to generate for display the derived first plurality of classification rules, the derived second plurality of classification rules, the calculated accuracy, and the suggested additional variable.

In some aspects, a system for deriving classification rules from documents and a database using rule-based machine learning includes a server computing device communicatively coupled to a database corresponding to an organization and a display device. The server computing device is configured to extract first variables from documents corresponding to an organization. The server computing device is also configured to extract second variables from the database corresponding to the organization. Further, the server computing device is configured to filter the extracted second variables based on at least one of null values, repeat variables, location variables, ID variables, or date variables. The server computing device is also configured to derive first classification rules based on the first variables using a rule-based machine learning algorithm.

Further, the server computing device is configured to calculate an accuracy of the derived first classification rules. The server computing device is further configured to derive a second plurality of classification rules based on the first variables and the filtered second variables. The server computing device is also configured to generate for display the derived first classification rules, the derived second classification rules, the calculated accuracy, and the suggested additional variable on the display device.

In some embodiments, the server computing device is configured to calculate the accuracy of the derived first classification rules based on known classification rules corresponding to the organization.

In some embodiments, the server computing device is further configured to extract the first variables using natural language processing. In other embodiments, the database comprises demographic data, employment data, and benefit plan data.

In some embodiments, the server computing device is further configured to map the extracted first variables to corresponding entries of the database. In other embodiments, the server computing device is further configured to classify each of the extracted first variables and second variables as character-based or numeric. In some embodiments, the first classification rules are derived sequentially using the rule-based machine learning algorithm.

In some embodiments, the server computing device is further configured to derive the second classification rules based on the first variables and the filtered second variables. In other embodiments, the server computing device is further configured to calculate an accuracy of the derived second classification rules based on known classification rules corresponding to the organization. For example. in some embodiments, the server computing device is further configured to generate for display the derived first plurality of classification rules, the derived second plurality of classification rules, the calculated accuracy, and the suggested additional variable.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 6 is a diagram showing a visualization of exemplary display results for the exemplary process shown in FIG. 3, according to embodiments of the technology described herein.

DETAILED DESCRIPTION OF THE INVENTION

Typically, Plan Administration Manual (PAM) documents are finalized by employers prior to each year's enrollment period. During the year, employers could consider tweaking the eligibility criteria. Once approved, the configurations in HR systems are updated along with the PAM documents to maintain the consistency. Sometimes, PAM documents are not updated, leading to discrepancies between the eligibility criteria reflected in the PAM documents and the actual eligibility criteria selected by the employer. At certain times, the criteria provided by employers, correctly finds some participants not eligible for some benefits. However, employers want to provide those benefits to a few selective participants, and so requests to alter participant's eligibility status. Currently, HR systems do not have an option to force the change of eligibility status from the front-end. Hence, this change request is often sent to IT teams to change the eligibility status of the participant in the back-end database. The inconsistency for participant data and the forced status change of eligibility flag also leads to discrepancy.

Migrating from one HR system to another is often time consuming, taking months or even years to accomplish. Migration requires manually discovering eligibility rules for each plan by combining information from PAM documents, participant data and business knowledge. Since there is no single point of truth, the chances of missing critical information are quite high. Hence, the accuracy of the eligibility rules discovered is not guaranteed. Therefore, there is a need to improve the accuracy of migration from one HR system to another, and to decrease the time it takes to do so. The systems and methods described herein overcome these challenges by employing feature engineering techniques and rule-based machine learning.

In some aspects, the systems and methods described herein can include one or more mechanisms or methods for providing administrators with systems and methods for analyzing eligibility criteria from documents. The system and methods can include mechanisms or methods for deriving classification rules for eligibility criteria from documents and databases. The systems and methods described herein can provide administrators with systems and methods for deriving classification rules from documents using rule-based machine learning. The systems and methods described herein can include one or more mechanisms or methods for deriving classification rules from documents and a database using rule-based machine learning. The systems and methods described herein can facilitate administrators with systems and methods for deriving classification rules from documents and databases using rule-based machine learning.

Figure 1:
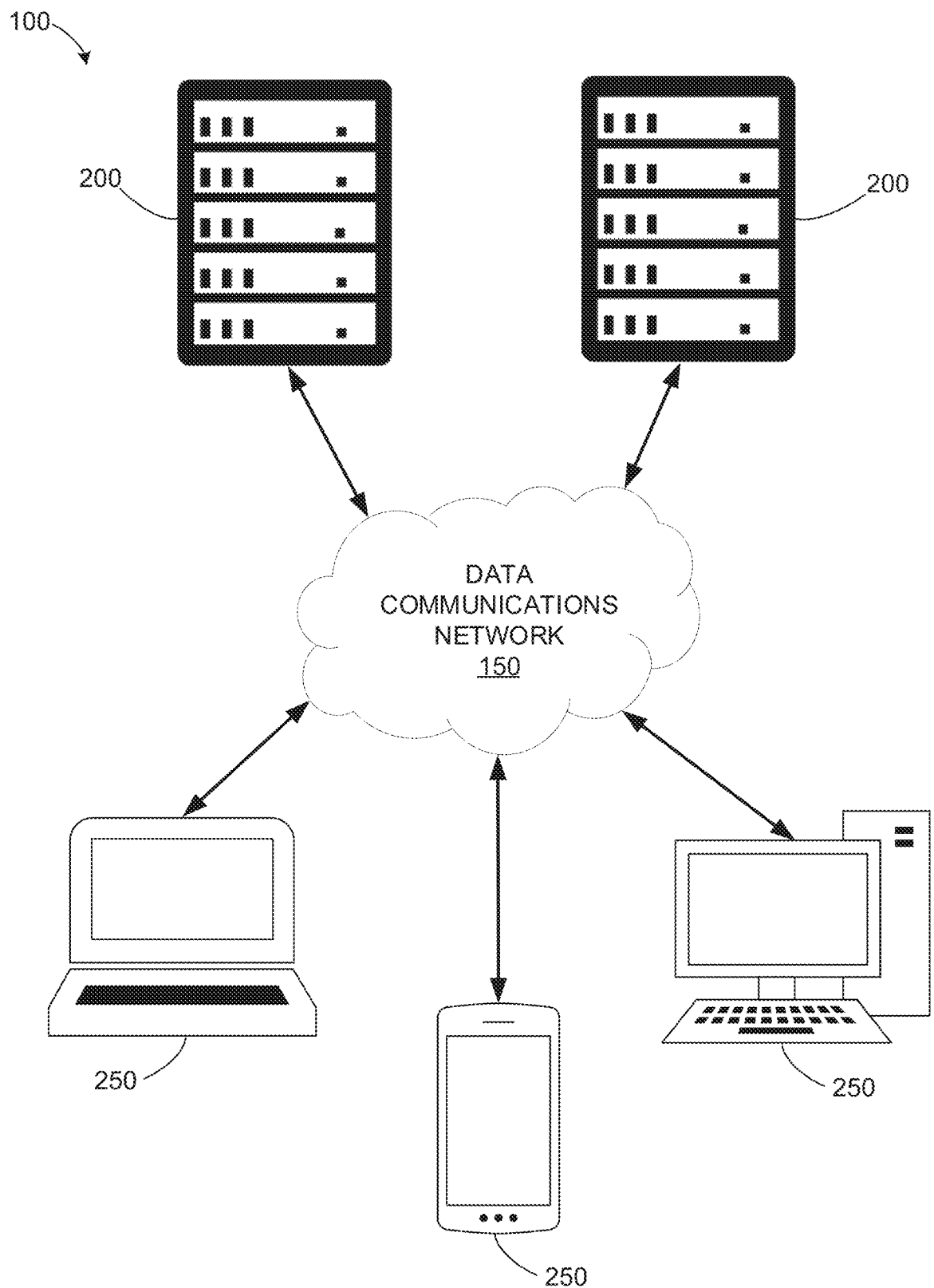
FIG. 1 is a block diagram of an exemplary data communications network, according to embodiments of the technology described herein.
Figure 2:
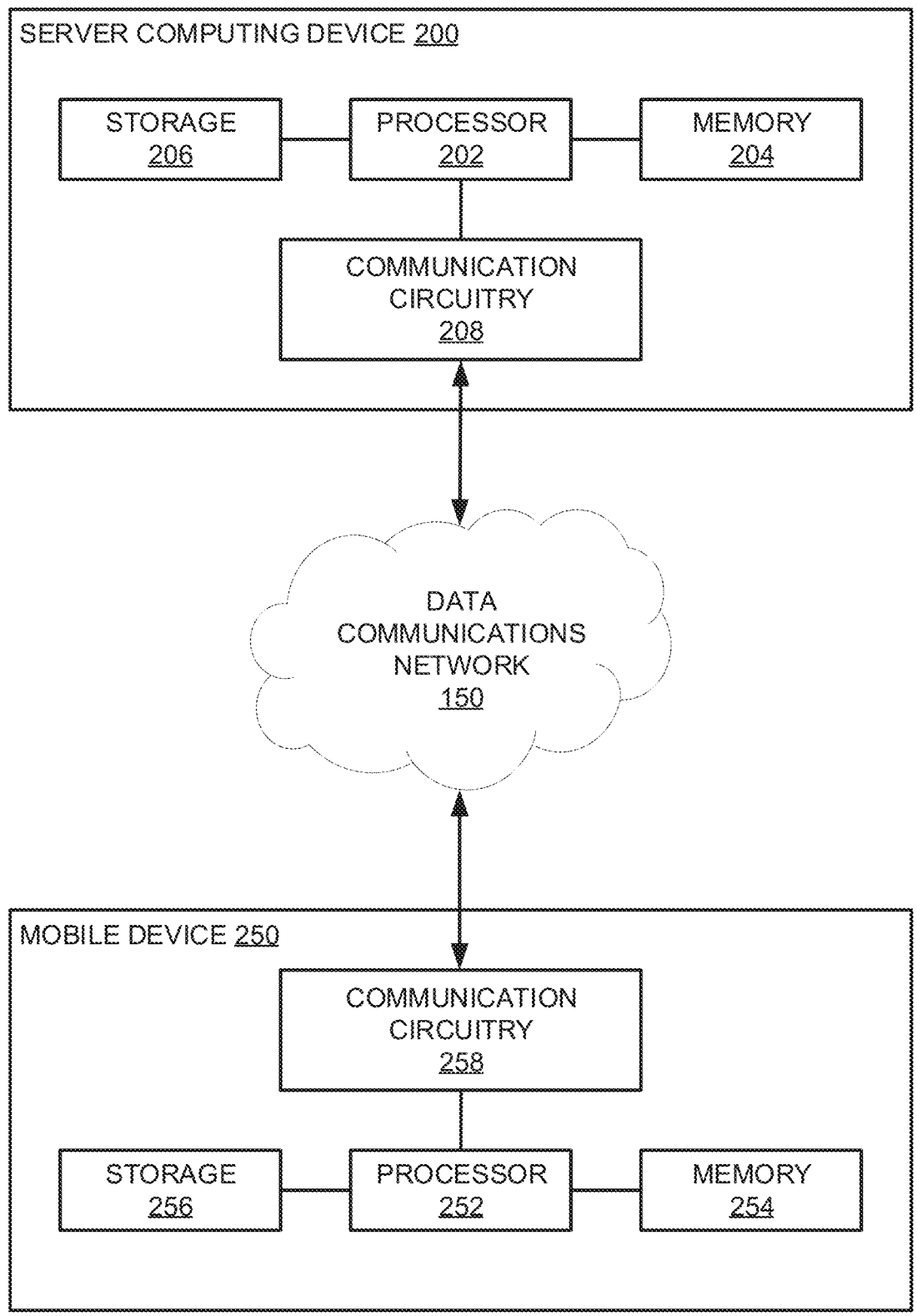
FIG. 2 is a block diagram of an exemplary server computing device and an exemplary mobile device, according to embodiments of the technology described herein.

Referring to FIGS. 1 and 2, an exemplary communications system 100 includes data communications network 150, exemplary server computing devices 200, and exemplary mobile devices 250. In some embodiments, the system 100 includes one or more server computing devices 200 and one or more mobile devices 250. Each server computing device 200 can include a processor 202, memory 204, storage 206, and communication circuitry 208. Each mobile device 250 can include a processor 252, memory 254, storage 256, and communication circuitry 258. In some embodiments, communication circuitry 208 of the server computing devices 200 is communicatively coupled to the communication circuitry 258 of the mobile devices 250 via data communications network 150. Communication circuitry 208 and communication circuitry 258 can use Bluetooth, Wi-Fi, or any comparable data transfer connection. The mobile devices 250 can include personal workstations, laptops, tablets, mobile devices, or any other comparable device.

Figure 3:
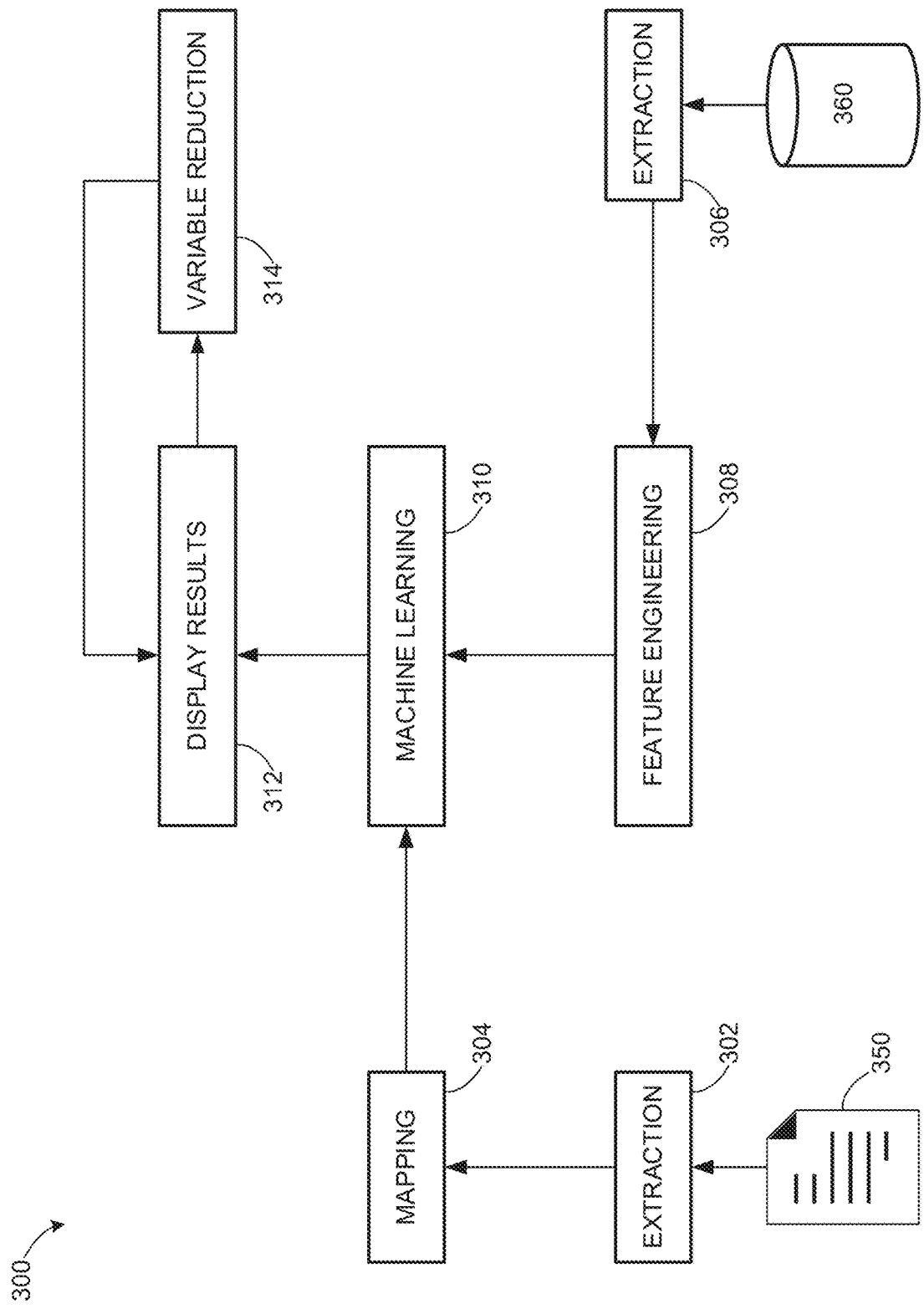
FIG. 3 is a diagram showing a visualization of an exemplary process for deriving classification rules from documents and databases, according to embodiments of the technology described herein.

An exemplary process 300 for deriving classification rules from documents and databases is illustrated in FIG. 3. As shown, the process 300 starts with initial variable extraction 302 from PAM documents 350. For example, process 300 can be implemented on a web self-service application that allows the authorized users to access the system through any web browser like Chrome, Firefox, Safari and Internet Explorer on their local machine. In some embodiments, the User Interface (UI) of the tool is developed in Angular JS and Node.js, and allows the user to select one of the employers (e.g. Office Depot) from a drop-down list. In some embodiments, a user can click a "Generate Report" button, initiating the front-end to send a request to the business logic to automate the process of document exploration from the PAM documents 350.

Initial variable extraction 302 allows for replication of the manual effort of information extraction from PAM documents. In some embodiments, the document exploration and information extraction are performed using Natural Language Processing (NLP). For example, BeautifulSoup is one of the popular libraries provided by Python to scrape data from HTML pages. Every tag in HTML can have attribute information (i.e., class, id, href, and other useful information) that helps in identifying the element uniquely. By analyzing the HTML tags and their attributes in the PAM document 350, the benefit plan types and the plan names offered by the employers to its participants can be identified and extracted. Similarly, under the eligibility section of each benefit plan types, the variables and the eligibility criteria rule provided by the employer can be extracted.

Process 300 continues through initial variable mapping 304. For example, the finite set of variables (initial findings) extracted from PAM documents 350 can be mapped to its corresponding database table and column name. In some embodiments, there are a set of variables which are more frequently used than others. These variables, for example, can be manually mapped and stored to be utilized in the mapping of variables for other employers.

Process 300 continues through data extraction 306 from database 360. In some embodiments, the PAM documents 350 have inconsistencies when compared with actual business criteria. Analyzing benefits data from database 360 can provide critical variables for deriving eligibility, which could be missing in the PAM documents 350. In some embodiments, the process of querying and scanning the database 360 is performed automatically and in parallel to initial variable extraction 302. In some embodiments, the database 360 contains participants demographic data, employment data and selected benefit plan data across 10 tables comprising of total 906 variables. In other embodiments, the variables of the tables include data type, distinct values, maximum and minimum values, etc.

Figure 4:
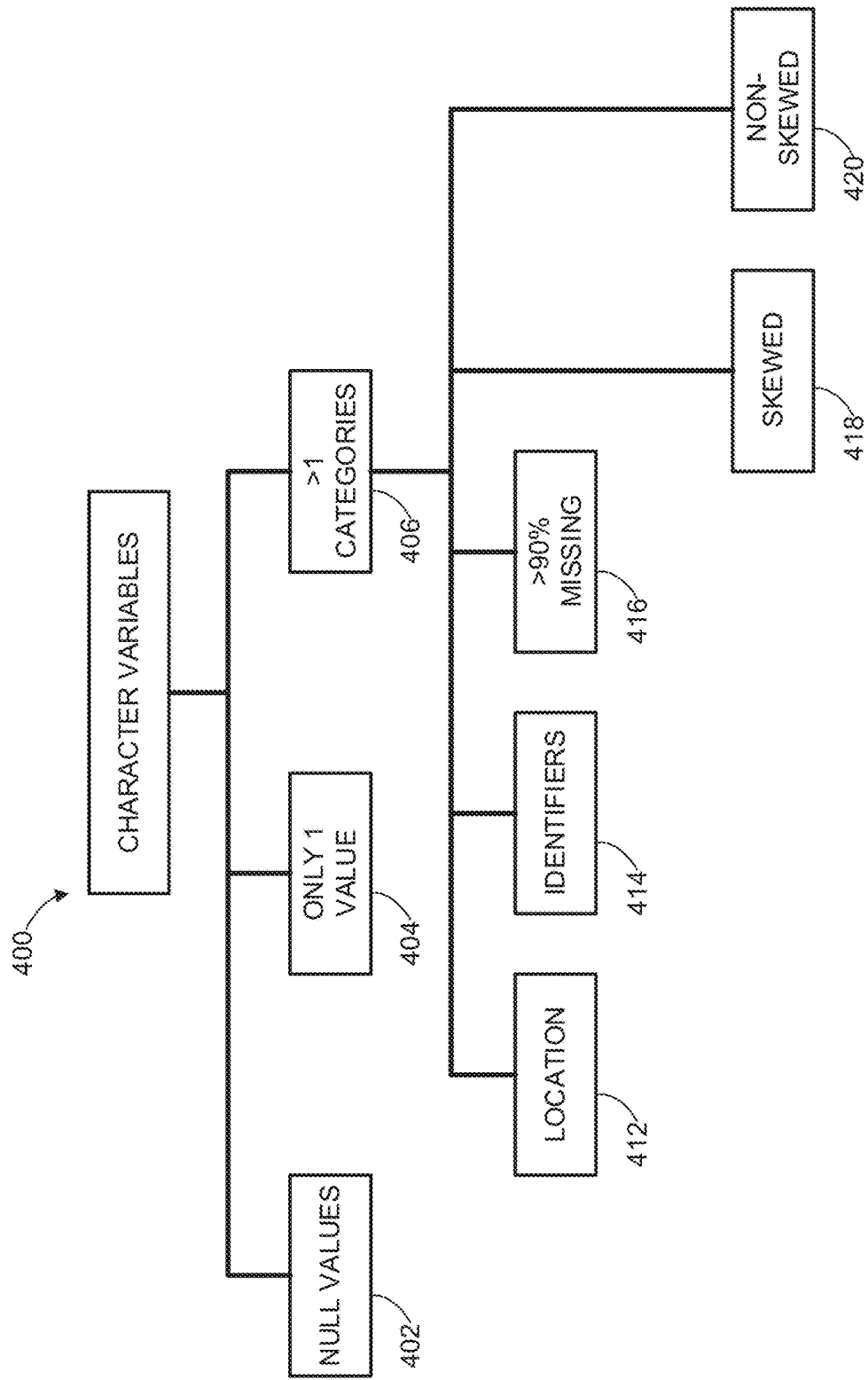
FIG. 4 is a diagram showing a visualization of exemplary feature engineering of character variables for the exemplary process shown in FIG. 3, according to embodiments of the technology described herein.
Figure 5:
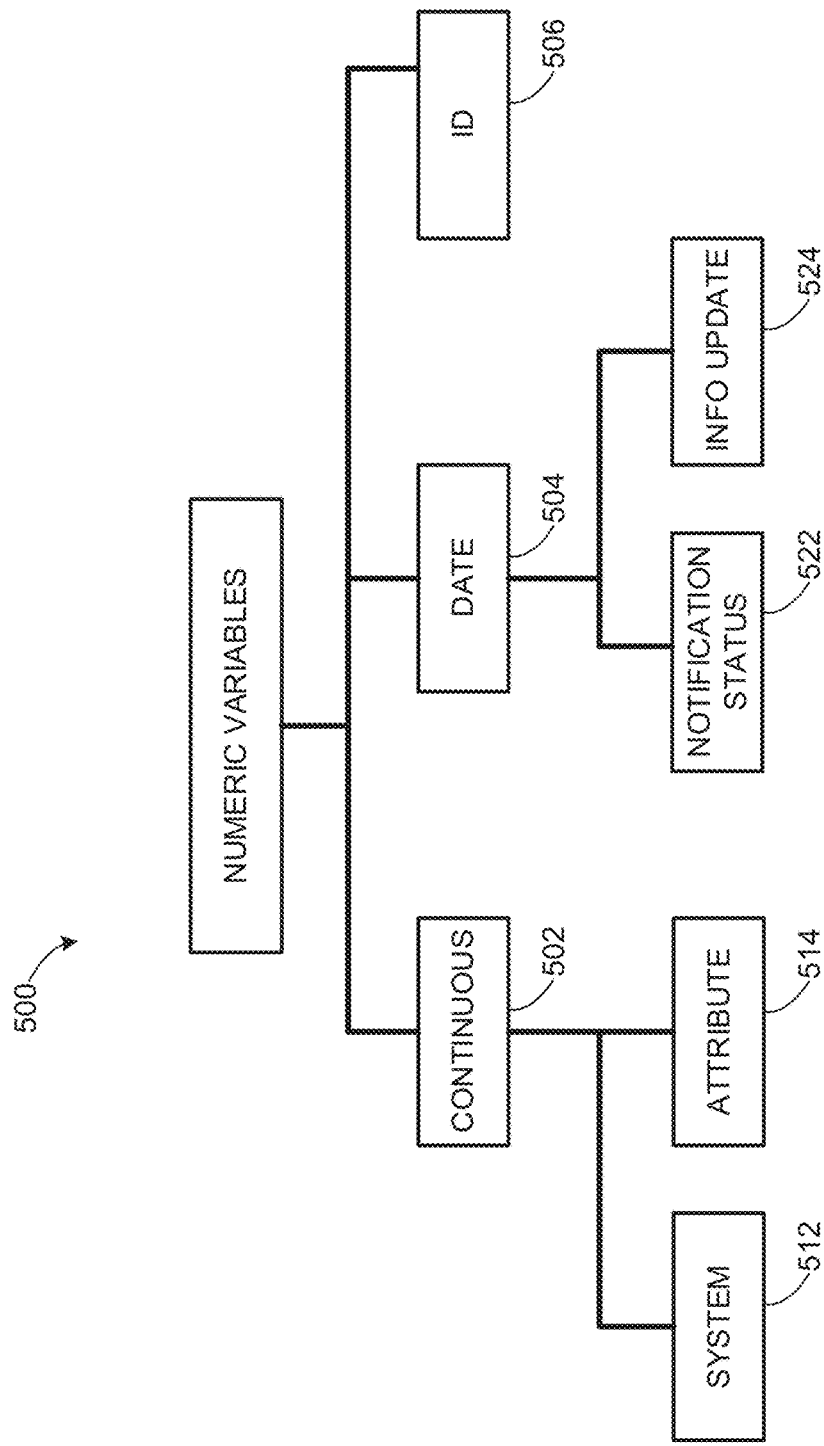
FIG. 5 is a diagram showing a visualization of exemplary feature engineering of numeric variables for the exemplary process shown in FIG. 3, according to embodiments of the technology described herein.

Process 300 continues through feature engineering 308. As shown in relation to FIGS. 4 and 5, the sequence of logical operations performed on the variables to filter them can be based on their data type. On a high level, the variables are classified to either character 400 or numeric 500. The classifications of character variables 400 include Null values 402, only one value 404, and greater than one categories 406. In some embodiments, the greater than one categories 406 can include location variables 412, identifier variables 414, greater than 90% missing variables 416, skewed variables 418, and non-skewed variables 420. The classification of numeric variables 500 include continues variables 502, date variables 504, and ID variables 506. In some embodiments, the continuous variables 502 include system variables 512 and attribute variables 514. In some embodiments, the date variables 504 include notification status variables 522 and info update variables 524.

Generally, not all variables will be utilized by all/some employers. So, many variables among them go unused and contain Null values 402. Analyzing the character variables further, many variables such as client name, country (if all participants are from the same region e.g. United States of America) will hold same value for all participants. In some embodiments, such variables do not play any role for deriving eligibility rules and are removed. While location variables such as state, zip code are generally important, their significance varies from one benefit plan to another. In some embodiments, ID variables 506 such as person_id, payroll_id and system variables 512 such as object_version_number are insignificant and are removed. Date variables 504 such as date_of_birth, date_of_joining often play an important role towards the benefit plan eligibility of participants. Through feature engineering 308, data exploration, data clean-up and data transformation are performed, which results with filtered set of variables for the machine learning process 310.

Process 300 continues by deriving rules through machine learning 310. By applying technologies such as machine learning (ML) to the data, classification rules can be learned and derived. To solve data migration challenges, in some embodiments, tree and rule-based algorithms techniques can be implemented. For example, when implementing decision trees in Python, algorithms require the non-numerical labels to be converted to number labels using label encoder. However, the generated rules from the decision tree may not make business sense. On the other hand, in some embodiments, sequential covering is a general procedure that repeatedly learns a single rule to create a decision list (or set) that covers the entire dataset rule by rule. Many rule-based algorithms are variants of the sequential covering and are effective. In some embodiments, sequential covering algorithms are implemented in R.

In some aspects, by applying ML on the initial findings, eligibility rules for each plan can be generated. Further, the baseline accuracy and misclassifications can be computed. As discussed above, there could be some significant variables driving the eligibility which may have missed out when performing manual analysis. In some embodiments, by applying ML on the filtered variables, eligibility rules can be derived by iteratively adding one variable at a time to initial discovered variables. The new accuracy and misclassification can then be computed and compared with the initial accuracy and misclassifications.

Process 300 continues by displaying the ML results 312. For example, as shown in FIG. 6, display results 600 show the benefit plan names provided by the employer, followed by the initial discovered variables from the PAM documents 350 and baseline accuracy. In some embodiments, the best ML performance with the initial variables and one additional variable is displayed as well as the suggested list of variables. In some embodiments, display results 600 also shows the misclassified count (shown in brackets). Display results 600 allows an administrator the opportunity of having a snapshot view of all the other possible variables that could help improve the rule with higher performance. In some embodiments, display results 600 can be generated on a mobile device 250.

Process 300 continues through variable reduction 314. For example, in some embodiments, administrators with business knowledge can review the list of variables and the derived rules to evaluate if the variable is valid and accepted from a business perspective. In some embodiments, the variable reduction process 314 can be automated based on historical data and a minimum accuracy required. After variable reduction 314, process 300 finishes by displaying the new results 312. For example, in some embodiments, the variables and the values with the conditions that participants should have to be eligible for a particular plan can be displayed. In some embodiments, the results can be exported to be stored or transferred.

The systems and methods described herein use machine learning to facilitate analysis of eligibility rules. Generally, migration efforts from one HR system to another are preceded by a manual analysis of understanding the data before deriving eligibility criteria. In case of eligibility rules migration, an analyst reviews the PAM documents 350 and maps them to the database 360 table columns, and then performs the analysis to derive eligibility rules. Due to frequent inconsistencies between the PAM documents 350 and the actual configured rules in the current system, the manually derived eligibility rules cannot be guaranteed. The analyst requires some business knowledge and understanding of the database 360, to iterative select a group of variables to analyze, derive rules and evaluate the performance. In some embodiments, manually deriving eligibility rules for a single employer can take a significant amount of time; months or even years.

Process 300 can perform the variable extraction from PAM documents 350 using NLP and query to extract data from database 360. Process 300 can iteratively go through significant variables and apply the ML algorithm to identify the few variables which provides improved eligibility rules. For example, process 300 can assist administrators by finding hidden eligibility/ineligibility patterns. Further, process 300 provides improved accuracy and confidence of the results. The output of process 300 also provides the misclassified count along with accuracy. This allows administrators to focus their energy only on the misclassified participants and their data. Using process 300, the migration time can be shortened to weeks or even days.

Figure 7:
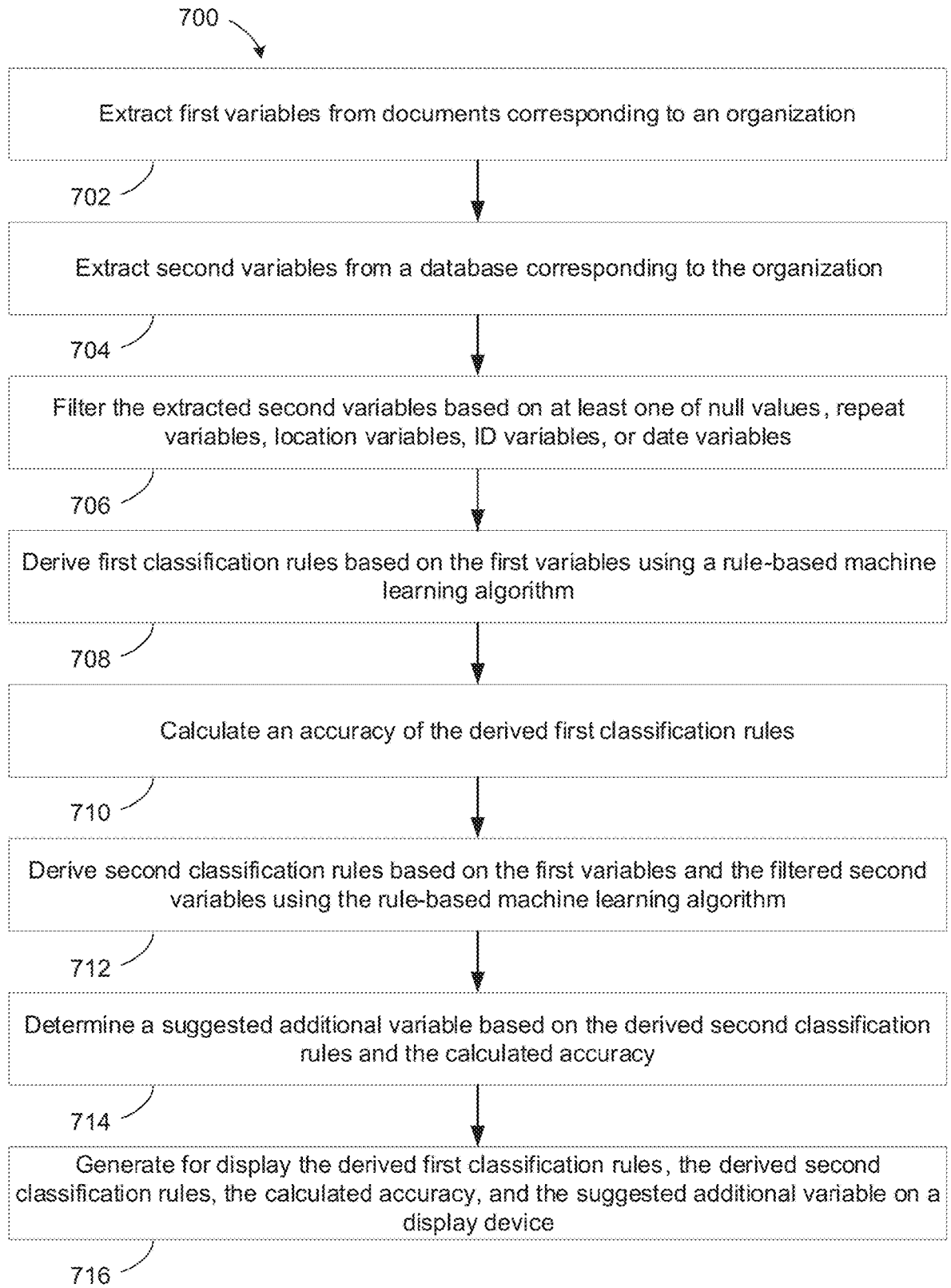
FIG. 7 is a flow diagram of a computer-implemented method for deriving classification rules from documents and a database using rule-based machine learning, according to embodiments of the technology described herein.

Referring to FIG. 7, a process 700 for deriving classification rules from documents and a database using rule-based machine learning is illustrated. The process 700 begins by extracting, by a server computing device 200, first variables from documents corresponding to an organization in step 702. For example, the server computing device 200 can be configured to extract first variables from PAM documents 350 corresponding to an organization. In some embodiments, the first variables are extracted from the PAM documents 350 using natural language processing.

Process 700 continues by extracting, by the server computing device 200, second variables from a database corresponding to the organization in step 704. For example, the server computing device 200 can be configured to extract second variables from database 360 corresponding to the organization. In some embodiments, the database 360 includes demographic data, employment data, and benefit plan data. In some embodiments, the server computing device 200 is further configured to map the extracted first variables to corresponding entries of the database 360. In some embodiments, the server computing device 200 is further configured to classify each of the extracted first variables and extracted second variables as character variables 400 or numeric variables 500.

Process 700 continues by filtering, by the server computing device 200, the extracted second variables based on at least one of null values, repeat variables, location variables, ID variables, or date variables in step 706. As discussed in relation to FIGS. 4 and 5, in some embodiments, some of the extracted second variables are insignificant and are removed. For example, in some embodiments, some of the extracted second variables contain Null values 402. In other embodiments, some of the extracted second variables contain ID variables 506 and system variables 512.

Process 700 continues by deriving, by the server computing device 200, first classification rules based on the first variables using a rule-based machine learning algorithm in step 708. For example, as discussed in relation to FIG. 3, the server computing device 200 can be configured to implement tree and/or rule-based machine learning algorithms to derive the first classification rules. In some embodiments, the first classification rules are derived sequentially using the rule-based machine learning algorithm.

Process 700 continues by calculating, by the server computing device 200, an accuracy of the derived first classification rules in step 710. For example, in some embodiments, the server computing device 200 is configured to calculate the accuracy of the derived first classification rules based on known classification rules corresponding to the organization.

Process 700 continues by deriving, by the server computing device 200, second classification rules based on first variables and the filtered second variables using a rule-based machine learning algorithm in step 712. In some embodiments, the server computing device 200 can be configured to derive the second classification rules using a rule-based machine learning algorithm. Process 700 continues by determining, by the server computing device 200, a suggested additional variable based on the derived second classification rule and the calculated accuracy in step 714. In some embodiments, the server computing device 200 determines the suggested additional variable by iteratively calculating accuracies when adding variables to the first variables to derive second classification rules. The server computing device 200 can determine the suggested additional variable based on the variable that resulted in the highest accuracy. Process 700 finishes by generating, by the server computing device 200, for display the derived first classification rules, the derived second classification rules, the calculated accuracy, and the suggested additional variable in step 716. For example, in some embodiments, the server computing device 200 can be configured to generate display results 600 on a mobile device 250.

In some embodiments, the server computing device 200 is further configured to derive the second classification rules based on the first variables and the filtered second variables. For example, in some embodiments, the server computing device 200 is further configured to calculate an accuracy of the derived second classification rules based on known classification rules corresponding to the organization. In some embodiments, the server computing device 200 is further configured to generate for display the derived second classification rules, the calculated accuracy of the derived second classification rules, and the suggested additional variable.

In some aspects, process 700 can be implemented on a system for deriving classification rules from documents and a database using rule-based machine learning. The system includes a server computing device 200 communicatively coupled to a database 360 corresponding to an organization and a display device 250. The server computing device 200 is configured to extract first variables from documents 350 corresponding to an organization. The server computing device 200 is also configured to extract second variables from the database 360 corresponding to the organization. Further, the server computing device 200 is configured to filter the extracted second variables based on at least one of null values, repeat variables, location variables, ID variables, or date variables. The server computing device 200 is also configured to derive first classification rules based on the first variables using a rule-based machine learning algorithm.

Further, the server computing device 200 is configured to calculate an accuracy of the derived first classification rules. The server computing device 200 is further configured to derive a second plurality of classification rules based on the first plurality of variables and the suggested additional variable. The server computing device 200 is configured to calculate an accuracy of the derived second classification rules and the suggested additional variable. The server computing device 200 is also configured to generate for display the derived first classification rules, the derived second classification rules, the calculated accuracy, and the suggested additional variable on the display device 250.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A method for deriving classification rules from documents and a database using rule-based machine learning, the method comprising:
   extracting, by a server computing device, a first plurality of variables from documents corresponding to an organization;
   extracting, by the server computing device, a second plurality of variables from a database corresponding to the organization;
   filtering, by the server computing device, the extracted second plurality of variables based on at least one of null values, repeat variables, location variables, ID variables, or date variables;
   deriving, by the server computing device, a first plurality of classification rules based on the first plurality of variables using a rule-based machine learning algorithm, comprising:
   a) executing the rule-based machine learning algorithm using the first plurality of variables as input to derive a classification rule and identify a subset of the first plurality of variables that satisfy the classification rule,
   b) removing the identified subset of variables from the first plurality of variables,
   c) repeating steps a) and b) using the remaining first plurality of variables as input to identify additional subsets of the remaining variables that satisfy additional classification rules, and
   d) storing the classification rules derived by the rule-based machine learning algorithm in step a) as the first plurality of classification rules;
   calculating, by the server computing device, an accuracy of the derived first plurality of classification rules;
   deriving, by the server computing device, a second plurality of classification rules based on the first plurality of variables and filtered second plurality of variables using the rule-based machine learning algorithm, comprising:
   e) executing the rule-based machine learning algorithm using the first plurality of variables and one of the filtered second plurality of variables as input to derive a classification rule and identify a subset of the first plurality of variables and one of the filtered second plurality of variables that satisfy the classification rule,
   f) removing the identified subset of variables from the first plurality of variables and the one of the filtered second plurality of variables,
   g) updating the calculated accuracy of the derived first plurality of classification rules based upon the first plurality of variables and the one of the filtered second plurality of variables,
   h) repeating steps e), f) and g) using the remaining first plurality of variables and another one of the filtered second plurality of variables as input to identify additional subsets of the remaining variables that satisfy additional classification rules, and
   i) storing the classification rules generated by the rule-based machine learning algorithm in step e) as the second plurality of classification rules; and
   identifying, by the server computing device, a suggested additional variable from the filtered second plurality of variables for inclusion in the first plurality of variables based upon the updated accuracy of the derived first plurality of classification rules; and
   generating, by the server computing device, for display the derived first plurality of classification rules, the derived second plurality of classification rules, the updated accuracy of the derived first plurality of classification rules, and the suggested additional variable.

2. The method of claim 1, wherein the server computing device is configured to calculate the accuracy of the derived first plurality of classification rules based on a known plurality of classification rules corresponding to the organization.

3. The method of claim 1, wherein the server computing device is further configured to extract the first plurality of variables using natural language processing.

4. The method of claim 1, wherein the database comprises demographic data, employment data, and benefit plan data.

5. The method of claim 1, wherein the server computing device is further configured to map the extracted first plurality of variables to corresponding entries of the database.

6. The method of claim 1, wherein the server computing device is further configured to classify each of the extracted first plurality of variables and second plurality of variables as character-based or numeric.

7. The method of claim 1, wherein the first plurality of classification rules are derived sequentially using the rule-based machine learning algorithm.

8. The method of claim 1, wherein the server computing device is further configured to sequentially derive the second plurality of classification rules based on the first plurality of variables and the filtered second plurality of variables using the rule-based machine learning algorithm.

9. The method of claim 8, wherein the server computing device is further configured to calculate an accuracy of the derived second plurality of classification rules based on a known plurality of classification rules corresponding to the organization.

10. A system for deriving classification rules from documents and a database using rule-based machine learning, the system comprising:
   a server computing device communicatively coupled to a database corresponding to an organization and a display device, the server computing device configured to:
   extract a first plurality of variables from documents corresponding to an organization;
   extract a second plurality of variables from the database corresponding to the organization;
   filter the extracted second plurality of variables based on at least one of null values, repeat variables, location variables, ID variables, or date variables;
   derive a first plurality of classification rules based on the first plurality of variables using a rule-based machine learning algorithm, comprising:
      a) executing the rule-based machine learning algorithm using the first plurality of variables as input to derive a classification rule and identify a subset of the first plurality of variables that satisfy the classification rule,
      b) removing the identified subset of variables from the first plurality of variables,
      c) repeating steps a) and b) using the remaining first plurality of variables as input to identify additional subsets of the remaining variables that satisfy additional classification rules, and
      d) storing the classification rules derived by the rule-based machine learning algorithm in step a) as the first plurality of classification rules;
   calculate an accuracy of the derived first plurality of classification rules;
   derive a second plurality of classification rules based on the first plurality of variables and filtered second plurality of variables using a rule-based machine learning algorithm, comprising:
      e) executing the rule-based machine learning algorithm using the first plurality of variables and one of the filtered second plurality of variables as input to derive a classification rule and identify a subset of the first plurality of variables and one of the filtered second plurality of variables that satisfy the classification rule,
      f) removing the identified subset of variables from the first plurality of variables and the one of the filtered second plurality of variables,
      g) updating the calculated accuracy of the derived first plurality of classification rules based upon the first plurality of variables and the one of the filtered second plurality of variables,
      h) repeating steps e), f) and g) using the remaining first plurality of variables and another one of the filtered second plurality of variables as input to identify additional subsets of the remaining variables that satisfy additional classification rules, and
      i) storing the classification rules generated by the rule-based machine learning algorithm in step e) as the second plurality of classification rules; and
   identify a suggested additional variable from the filtered second plurality of variables for inclusion in the first plurality of variables based upon the updated accuracy of the derived first plurality of classification rules; and
   generate for display the derived first plurality of classification rules, the derived second plurality of classification rules, the calculated accuracy, and the suggested additional variable on the display device.

11. The system of claim 10, wherein the server computing device is configured to calculate the accuracy of the derived first plurality of classification rules based on a known plurality of classification rules corresponding to the organization.

12. The system of claim 10, wherein the server computing device is further configured to extract the first plurality of variables using natural language processing.

13. The system of claim 10, wherein the database comprises demographic data, employment data, and benefit plan data.

14. The system of claim 10, wherein the server computing device is further configured to map the extracted first plurality of variables to corresponding entries of the database.

15. The system of claim 10, wherein the server computing device is further configured to classify each of the extracted first plurality of variables and second plurality of variables as character-based or numeric.

16. The system of claim 10, wherein the first plurality of classification rules are derived sequentially using the rule-based machine learning algorithm.

17. The system of claim 10, wherein the server computing device is further configured to sequentially derive the second plurality of classification rules based on the first plurality of variables and the filtered second plurality of variables using the rule-based machine learning algorithm.

18. The system of claim 17, wherein the server computing device is further configured to calculate an accuracy of the derived second plurality of classification rules based on the known plurality of classification rules corresponding to the organization.

* * * * *